L. JANQUART.
BEAN SNIPPER.
APPLICATION FILED JULY 25, 1912.

1,086,056.

Patented Feb. 3, 1914.

2 SHEETS—SHEET 1.

Witnesses

Lyman Janquart, Inventor.
by C. A. Snow & Co.
Attorneys

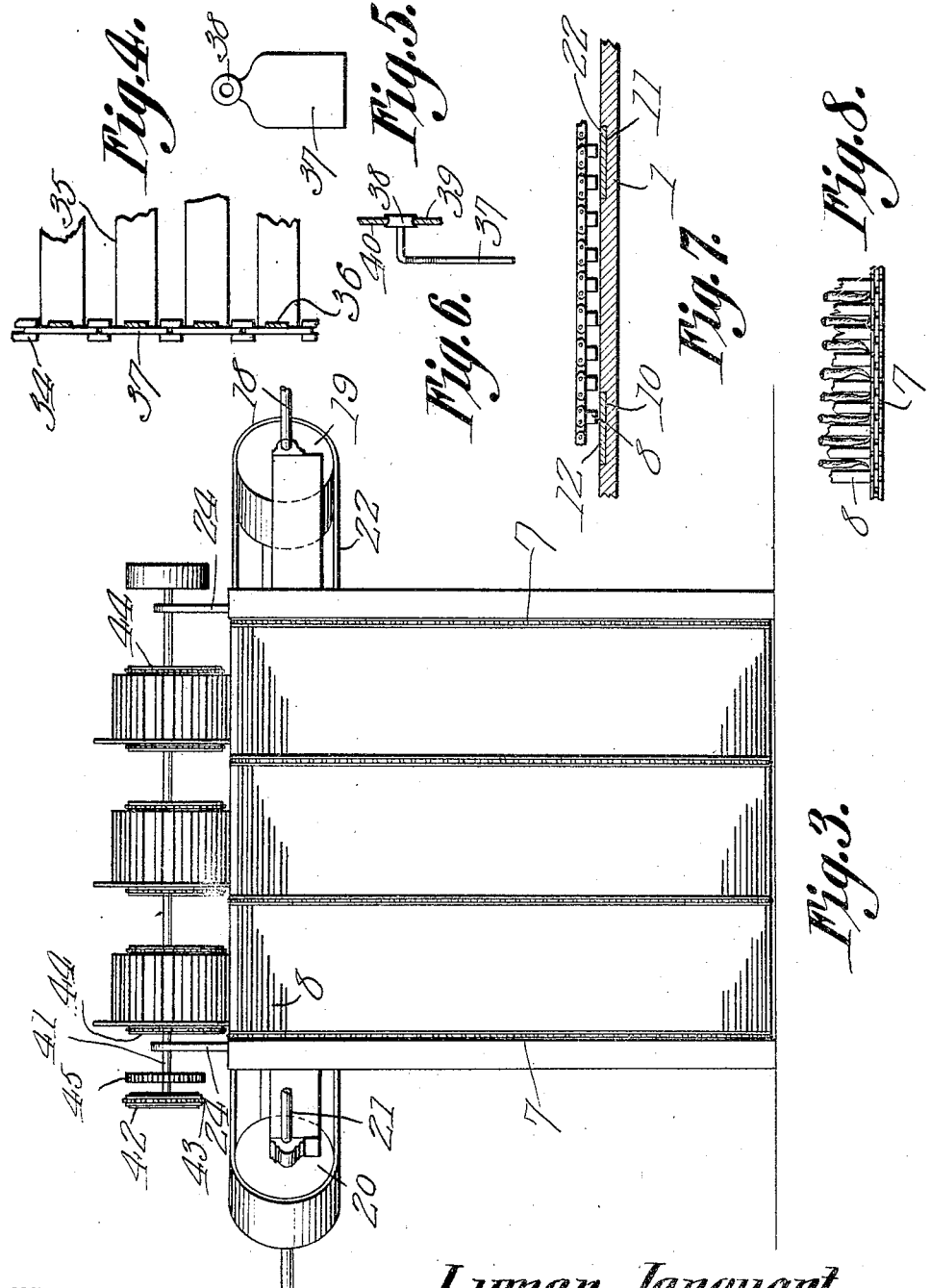

# UNITED STATES PATENT OFFICE.

LYMAN JANQUART, OF MENOMINEE, MICHIGAN.

BEAN-SNIPPER.

1,086,056.

Specification of Letters Patent.   Patented Feb. 3, 1914.

Application filed July 25, 1912. Serial No. 711,514.

*To all whom it may concern:*

Be it known that I, LYMAN JANQUART, a citizen of the United States, residing at Menominee, in the county of Menominee and State of Michigan, have invented certain new and useful Improvements in Bean-Snippers, of which the following is a specification.

This invention relates to machines for cutting off the ends of string beans, its object being to provide a simple and efficient machine of this type having novel means whereby the beans, while passing through the machine will be held in parallel rows and shifted successively from one side to the other of the machine so that first one end of each bean will be presented to one set of cutters after which the other ends of the beans will be presented to another set of cutters.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
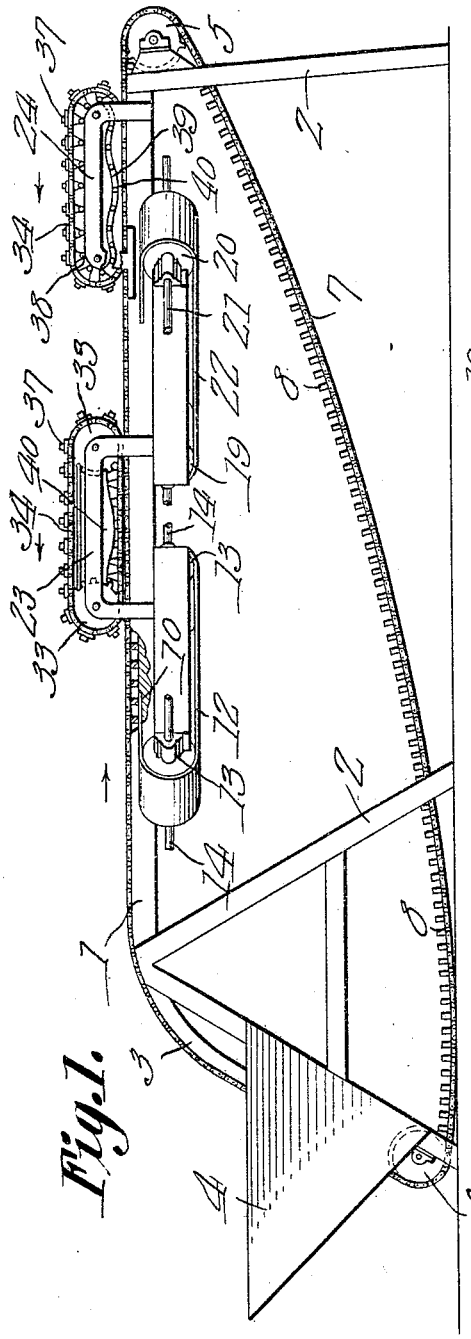
Figure 2:
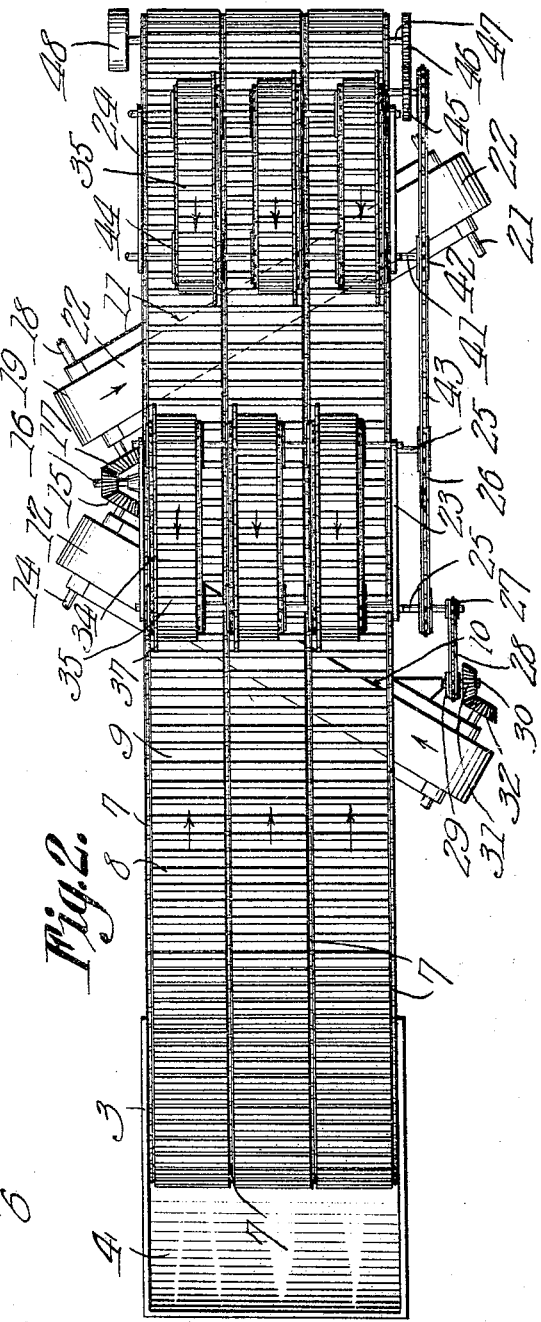

In said drawings: Figure 1 is a side elevation partly in section of the machine. Fig. 2 is a plan view thereof. Fig. 3 is an enlarged end elevation. Fig. 4 is an enlarged plan view of a portion of the cutting mechanism, the blades being shown in section. Fig. 5 is an enlarged side elevation of one of the blades. Fig. 6 is an edge view thereof, the adjacent portions of the guides being shown in section. Fig. 7 is an enlarged longitudinal section through a portion of the table and the conveyer belt thereon and showing the diagonal belt also in section. Fig. 8 is an enlarged plan view of a portion of the table and of the conveyer thereon and showing the positions of the beans while being moved along the table.

Referring to the figures by characters of reference 1 designates an elongated table mounted upon suitable supports such as shown at 2 and merging, at one end, into a downwardly curved portion 3 which extends downwardly into one end portion of a feed hopper 4. Guide wheels or sprockets 5 are mounted at that end of the table 1 remote from the hopper 4 and additional guide wheels 6 or the like are located close to the bottom of the hopper. These guide wheels as well as the table 1 and the rounded portion 3 support an endless conveyer made up of a series of parallel endless chains 7 connected by parallel slats or flights 8 whereby one or more parallel series of spaces are formed between the slats, as shown at 9, each space being of sufficient size to receive a bean. The slats or flights 8 are so arranged as to slide along the top face of the table 1 and its curved end portion 3 so as thus to drag along the table those beans engaged by the slats or flights 8. A broad obliquely disposed groove or channel 10 is formed in the top face of the table 1 and extends throughout the width thereof and another broad obliquely disposed groove or channel 11 is also formed in said face of the table, and the two grooves or channels 10 and 11 diverge toward one side of the table. Mounted in the channel 10 is a broad diagonally disposed endless belt 12 mounted on rollers 13 which are secured to shafts 14 mounted beyond the sides of the table. One of these shafts 14 may be provided with a gear 15 meshing with an intermediate gear 16 which, in turn, engages a gear 17 secured to another shaft 18 located beyond one side of the table and on which a roller 19 is secured. Another roller 20 is secured to a shaft 21 mounted at the other side of the table and mounted on these two rollers 19 and 20 is a broad endless belt 22 the upper end of which rests within the groove or channel 11. Instead of the mechanism described for transmitting motion from shaft 14 to shaft 18, any other suitable mechanism may be used.

Upstanding from the sides of the table 1 are supporting structures 23 and 24, the structures 23 being arranged above the space between the belts 12 and 22 while the structures 24 are disposed above the space between the belt 22 and the discharge end of the table. Parallel shafts 25 are journaled in the supports 23 and are provided at one end with sprockets 26. Another sprocket 27 is secured to one of these shafts 25 and is adapted to transmit motion through a chain 28 to a sprocket 29 rotating on a stud 30 outstanding from the table 1. A gear 31 rotates with the sprocket 29 and meshes with another gear 32 which is secured to one of the shafts 14. Thus it will be seen that motion may be transmitted from one of the shafts 25 through the endless belt 12. Obviously, if desired, other mechanism than that shown and described may be used for transmitting motion to the belt 12 from the shaft 25.

Sprockets 33 are arranged in pairs upon each shaft 25, the corresponding pairs on the two shafts engaging endless chains 34 secured to the ends of cross strips 35. These cross strips are so proportioned and located as to move downwardly onto the table 1 and between the slats 8 on the conveyer 7 and thus hold against the table any beans which may be located in the spaces 9 into which the strips 35 project. Recesses 36 are formed in the strips 35 adjacent one end and cutting blades 37 are mounted to slide vertically within the recesses and are provided, at one end, with rollers 38. These rollers are adapted to be brought successively into a curved slot 39 formed in a guide plate 40 supported by the shafts 23. By referring particularly to Fig. 2 it will be seen that the blades 37 of the different series are located close to the left ends of the series of spaces 9.

Shafts 41 are journaled in the supports 24 and have sprockets 42 at one end, these sprockets being engaged by a chain 43 which also engages the sprockets 26. Mounted on each of the shafts 41 are sprockets 44 arranged in pairs, and mounted on these sprockets are endless series of strips 35 such as hereinbefore described and which carry, at one end, cutting blades 37. These blades, however, lie close to the right end of the spaces 9 as will be apparent by referring to Fig. 2. A gear 45 is secured to one of the shafts 41 and receives motion, through a gear 46, from the shaft 47 on which the sprockets 5 are mounted. A pulley 48 may be secured to the shaft 47 so as to receive power from any suitable source.

In using the apparatus, the mechanism is set in motion so as to cause the conveyer 7—8 to move in the direction of the arrows in Fig. 1 whereupon the belts 12 and 22 will move in the direction indicated by the arrows on them while, at the same time, the cutting mechanism will move in the direction of the arrows thereon and as indicated in Fig. 2. The beans to be snipped are placed in the hopper 4 and will gravitate onto that portion of the conveyer moving upwardly along the downwardly curved end 3 of the table. The beans will become seated in the spaces 9 and will be pulled upwardly onto the table 1 and dragged along the table until they come onto the belt 12. This belt will be frictionally engaged by the beans and, as it moves obliquely, as indicated in Fig. 2, it will be seen that it will tend to drag the beans longitudinally of the spaces 9 until they are brought against the chains at the left ends of the spaces. After the beans assume these positions in the spaces 9 they move under the endless series of strips 35 and these strips move successively downwardly into the spaces 9 so as to press the beans tightly upon the table 1. The rollers 38 carried by the blades 37 are brought successively into the curved slot 39 and are forced downwardly by the walls of the slot so that the blades are thus caused to cut through the end portions of the beans and sever them. After the beans have come under these cutting blades, they are brought into position above the belt 22 and this belt operates to drag the beans laterally so as to bring them against the chains at the right ends of the series of spaces 9. Thus the uncut ends of the beans will be brought into position to be engaged by the cutting blades 37 carried by the endless chains on the sprockets 44. The blades of this series will operate in the same manner as the blades heretofore described and, after the beans pass from under these series of blades, it will be seen that both ends of each bean will have been cut off. The beans are discharged from the table at that end thereof remote from the hopper 4. This operation is carried on continuously and it will be apparent that it will require no attention except that necessary to keep the hopper 4 supplied with the beans to be cut.

What is claimed is:—

1. A bean snipper including an endless conveyer having bean receiving openings extending transversely therein, a table for supporting beans held within the openings, an obliquely disposed belt movable under the conveyer and upon the table for engaging the beans within said openings and dragging them toward one end of the spaces, and cutting means supported above said ends of the spaces for cutting the beans fed thereto.

2. A bean snipper including an endless conveyer having bean receiving spaces extending transversely thereof, each space being of greater length than the bean received thereby, a table for supporting the beans within the spaces, an obliquely disposed belt under the conveyer and above the table for frictionally engaging the beans in the several rows to drag them successively toward one end of the spaces in the conveyer, the bean receiving spaces being arranged in parallel rows and the obliquely disposed belt being extended under both rows, and cutting means above the paths of those ends of the spaces toward which the beans are shifted, said cutting means operating to successively sever the beans supplied thereto.

3. A bean snipper including an endless conveyer having transverse bean receiving spaces, a table for supporting beans within the spaces, means extending under the path of and adapted to engage the beans for dragging them toward the two ends of the spaces successively, an endless series of pressing strips movably supported above the path of said conveyer and movable successively into the spaces to bear upon the contents thereof, cutting blades movable with said strips and supported above the ends of the spaces in the conveyer, and means for automatically shifting said blades downwardly into the spaces to sever the end portions of the beans.

4. In a bean snipper the combination with an endless conveyer having bean holding spaces, of an endless series of holding strips movable downwardly into said spaces and onto the beans therein, a cutting blade slidably connected to each of the strips, a guide, and means upon the blades for successively engaging the guide to shift the blades downwardly into the spaces and sever the beans therein.

In testimony whereof I affix my signature in presence of two witnesses.

LYMAN JANQUART.

Witnesses:
J. F. GARBELL,
FLORENCE FRANK.